United States Patent
Seeley et al.

(10) Patent No.: US 9,238,773 B2
(45) Date of Patent: Jan. 19, 2016

(54) LUTETIUM OXIDE-BASED TRANSPARENT CERAMIC SCINTILLATORS

(71) Applicant: Lawrence Livermore National Security, LLC, Livermore, CA (US)

(72) Inventors: Zachary Seeley, Livermore, CA (US); Nerine Cherepy, Oakland, CA (US); Joshua Kuntz, Livermore, CA (US); Stephen A. Payne, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 336 days.

(21) Appl. No.: 13/623,811

(22) Filed: Sep. 20, 2012

(65) Prior Publication Data

US 2013/0075628 A1    Mar. 28, 2013

Related U.S. Application Data

(60) Provisional application No. 61/538,054, filed on Sep. 22, 2011.

(51) Int. Cl.
*C09K 11/78* (2006.01)
*G01T 1/20* (2006.01)
(Continued)

(52) U.S. Cl.
CPC ............. *C09K 11/7787* (2013.01); *B82Y 30/00* (2013.01); *C04B 35/50* (2013.01);
(Continued)

(58) Field of Classification Search
USPC ...................... 252/301.4 R; 501/153; 372/62; 250/370.08, 370.09, 370.11, 370.12, 250/362
See application file for complete search history.

(56) References Cited

U.S. PATENT DOCUMENTS

| | | | |
|---|---|---|---|
| 3,791,844 A | 2/1974 | Tecotzky et al. | |
| 4,092,540 A | 5/1978 | Barrett | |

(Continued)

FOREIGN PATENT DOCUMENTS

| | | | |
|---|---|---|---|
| CN | 101265098 | * | 9/2008 |
| CN | 101456735 | * | 6/2009 |

(Continued)

OTHER PUBLICATIONS

Translation for CN 10126598, Sep. 17, 2008.*

(Continued)

*Primary Examiner* — Carol M Koslow
(74) *Attorney, Agent, or Firm* — Zilka-Kotab, PC (57) ABSTRACT

In one embodiment, a transparent ceramic of sintered nanoparticles includes gadolinium lutetium oxide doped with europium having a chemical composition $(Lu_{1-x}Gd_x)_{2-y}Eu_yO_3$, where X is any value within a range from about 0.05 to about 0.45 and Y is any value within a range from about 0.01 to about 0.2, and where the transparent ceramic exhibits a transparency characterized by a scatter coefficient of less than about 10%/cm. In another embodiment, a transparent ceramic scintillator of sintered nanoparticles, includes a body of sintered nanoparticles including gadolinium lutetium oxide doped with a rare earth activator (RE) having a chemical composition $(Lu_{1-x}Gd_x)_{2-y}RE_yO_3$, where RE is selected from the group consisting of: Sm, Eu, Tb, and Dy, where the transparent ceramic exhibits a transparency characterized by a scatter coefficient of less than about 10%/cm.

20 Claims, 5 Drawing Sheets

(51) Int. Cl.

| | |
|---|---|
| *C09K 11/77* | (2006.01) |
| *C04B 35/50* | (2006.01) |
| *C04B 35/626* | (2006.01) |
| *C04B 35/645* | (2006.01) |
| *B82Y 30/00* | (2011.01) |

(52) U.S. Cl.
CPC ...... *C04B 35/62665* (2013.01); *C04B 35/6455* (2013.01); *C04B 2235/3224* (2013.01); *C04B 2235/5409* (2013.01); *C04B 2235/5454* (2013.01); *C04B 2235/608* (2013.01); *C04B 2235/6581* (2013.01); *C04B 2235/762* (2013.01); *C04B 2235/77* (2013.01); *C04B 2235/80* (2013.01); *C04B 2235/95* (2013.01); *C04B 2235/9653* (2013.01)

(56) References Cited

U.S. PATENT DOCUMENTS

| | | |
|---|---|---|
| 5,146,131 A | 9/1992 | Derks |
| 5,882,547 A | 3/1999 | Lynch et al. |
| 6,858,159 B2 | 2/2005 | Lyons |
| 7,547,895 B2 | 6/2009 | Manivannan et al. |
| 7,560,284 B2 | 7/2009 | Matsuura et al. |
| 7,938,983 B2 | 5/2011 | Mueller-Mach et al. |
| 2002/0181647 A1 | 12/2002 | Venkataramani et al. |
| 2003/0021374 A1 | 1/2003 | Venkataramani et al. |
| 2003/0183806 A1 | 10/2003 | Lyons |
| 2006/0214115 A1 | 9/2006 | Manivannan et al. |
| 2006/0261722 A1 | 11/2006 | Bueno et al. |
| 2007/0291378 A1 | 12/2007 | Kron et al. |
| 2010/0200757 A1 | 8/2010 | Sarin et al. |

FOREIGN PATENT DOCUMENTS

| | | | |
|---|---|---|---|
| EP | 300568 A1 | | 1/1989 |
| EP | 1705478 A1 | | 9/2006 |
| EP | 1867617 A1 | | 12/2007 |
| JP | S5933806 | | 2/1984 |
| JP | H06167598 A | | 6/1994 |
| JP | H10213665 A | | 8/1998 |
| WO | 03107441 A2 | | 12/2003 |
| WO | 2006113933 A2 | | 10/2006 |
| WO | WO 2010/078224 | * | 7/2010 |
| WO | 2011055075 A1 | | 5/2011 |

OTHER PUBLICATIONS

Translation of CN 101456735, Jun. 17, 2009.*
An et al., "Effects of ball milling and post-annealing on the transparency of spark plasma sintered Lu(2)O(3)," Ceramics International, vol. 37, No. 7, 2011, pp. 2263-2267.
An et al., "Fabrication of Transparent Lutetium Oxide by Spark Plasma Sintering," Journal of the American Ceramic Society, vol. 94, No. 3, 2011, pp. 695-698.
An et al., "Two-step pressure sintering of transparent lutetium oxide by spark plasma sintering," Journal of the European Ceramic Society, vol. 31, No. 9, 2011, pp. 1597-1602.
An et al., "Upconversion luminescence of Tm3+ and Yb3+-codoped lutetium oxide nanopowders," Journal of Alloys and Compounds, vol. 451, No. 1-2, 2008, pp. 538-541.
Bartram et al., "Hole traps in Lu 2O 3: Eu ceramic scintillators. I. Persistent afterglow," Journal of Luminescence, vol. 106, No. 2, 2004, pp. 159-168.
Bartram et al., "Hole traps in Lu 2O3: Eu ceramic scintillators. II. Radioluminescence and thermoluminescence," Journal of Luminescence, vol. 106, No. 2, 2004, pp. 169-176.
Cherepy et al., "Performance of Europium-Doped Strontium Iodide, Transparent Ceramics and Bismuth-loaded Polymer Scintillators," Proc. of SPIE, vol. 8142, 2011, pp. 81420W-1-81420W-8.
Cherepy et al., "Transparent Ceramic Scintillator Fabrication, Properties and Applications," Proceedings of SPIE—The International Society for Optical Engineering, vol. 7079, 2008, pp. 1-8.
Cherepy et al., "Transparent Ceramic Scintillators for Gamma Spectroscopy and Radiography," Proceedings of SPIE—The International Society for Optical Engineering, vol. 7805, 2010, pp. 1-7.
Fu et al., "Terbium-activated heavy scintillating glasses," Journal of Luminescence, vol. 128, No. 1, 2008, pp. 99-104.
Miller et al., "LU2O3 : Eu scintillator screen for x-ray imaging," Proceedings of SPIE—The International Society for Optical Engineering, vol. 5199, 2003, pp. 167-172.
Nagarkar et al., "A new large area scintillator screen for X-ray imaging," Nuclear Instruments & Methods in Physics Research Section B-Beam Interactions with Materials and Atoms, vol. 213, 2004, pp. 250-254.
Nagarkar et al., "A new x-ray scintillator for digital radiography," IEEE Transactions on Nuclear Science, vol. 50, No. 3, 2003, pp. 297-300.
Nagarkar et al., "Characterization of vapor-deposited Lu 2O 3:Eu 3+ scintillator for X-ray imaging applications," Proceedings of the SPIE—The International Society for Optical Engineering, vol. 7450, 2009, pp. 745003/1-745003/7.
Qin et al., "Effects of Doping Lu2O3 on Phase Transformation and Luminescence," IEEE Transactions on Nuclear Science, vol. 56, No. 5 2009, pp. 2979-2982.
Seeley et al., "Transparent Lu(2)O(3):Eu ceramics by sinter and HIP optimization," Optical Materials, vol. 33, No. 11, 2011, pp. 1721-1726.
Wisniewski et a., "Development of novel polycrystalline ceramic scintillators," IEEE Transactions on Nuclear Science, vol. 55, No. 3, 2008, pp. 1501-1508.
Wu et al., "Preparation of Europium-Doped Gadolinium Lutetium Oxide Solid Solution Transparent Ceramics and Its Optical Properties," IEEE Transactions on Nuclear Science, vol. 57, No. 3, 2010, pp. 1343-1347.
Zych et al., "Microstructure and Spectroscopy of Lu2O3 : Eu prepared using various synthesis techniques," Functional Nanomaterials for Optoelectronics and Other Applications, vol. 99-100, 2003, pp. 25-30.
Topping et al., "Lutetium oxide coatings by PVD," Nuclear Radiation Detection Materials, vol. 1038, 2008, pp. 115-120.
Cho et al., "Synthesis and characterization of Eu(3+) doped Lu(2)O(3) nanophosphor using a solution-combustion method," Journal of Sol-Gel Science and Technology, vol. 53, No. 2, 2010, pp. 171-175.
Dujardin et al., "Luminescence and Scintillation Properties at the Nanoscale," Ieee Transactions on Nuclear Science, vol. 57, No. 3, 2010, pp. 1348-1354.
Wisniewski et al., "Performance of new ceramic scintillators for gamma- and x-ray detection," Hard X-Ray and Gamma-Ray Detector Physics IX, vol. 6706, 2007, pp. 70619-70619.
Farman et al., "Effects of scintillator on the detective quantum efficiency (DQE) of a digital imaging system," Oral Surgery Oral Medicine Oral Pathology Oral Radiology and Endodontics, vol. 101, No. 2, 2006, pp. 221-225.
Farman et al., "Effects of scintillator on the modulation transfer function (MTF) of a digital imaging system," Oral Surgery Oral Medicine Oral Pathology Oral Radiology and Endodontics, vol. 99, No. 5, 2005, pp. 608-613.
Garcia-Murillo et al., "Elaboration and scintillation properties of Eu3+-doped Gd2O3 and Lu2O3 sol-gel films," Nuclear Instruments & Methods in Physics Research Section a-Accelerators Spectrometers Detectors and Associated Equipment, vol. 486, No. 1-2, 2002, pp. 181-185.
Garcia-Murillo et al., "Sol-gel elaboration and structural investigations of Lu(2)O(3):Eu(3+) planar waveguides," Journal of Sol-Gel Science and Technology, vol. 50, No. 3, 2009, pp. 359-367.
Garcia-Murillo et al., "Synthesis and properties of Lu2O3 sol-gel films," Journal of Alloys and Compounds, vol. 323, 2001, pp. 74-77.
Lempicki et al., "A new lutetia-based ceramic scintillator for X-ray imaging," Nuclear Instruments & Methods in Physics Research Section a-Accelerators Spectrometers Detectors and Associated Equipment, vol. 488, No. 3, 2002, pp. 579-590.
Garcia-Murillo et al., "Rare-Earth Actived Sol-Gel Films for Scintillator Applications," Journal of Dol-Gel Science and Technology 26, 2003, pp. 957-960.

(56) References Cited

OTHER PUBLICATIONS

Greskovich et al., "Ceramic Scintillators for Advanced, Medical X-my Detectors," American Ceramic Society Bulletin, vol. 71, No. 7, 1992, pp. 1120-1130.

Heller, A., "A Cat Scanner for Nuclear Weapon," S&TR CoLOSSIS, 2009, pp. 13-17.

Hoekstra, H.R., "Phase Relationships in the Rare Earth Sesquioxides at High Pressure," Inorganic Chemistry, vol. 5. No. 5, 1966, pp. 754-757.

Li et al., "Photoluminescent properties of $Ln_2O_3$:$Eu^{3+}$ (Ln = Y, Lu and Gd) prepared by hydrothermal process and sol-gel method," Materials Chemistry and Physics 119, 2010, pp. 471-477.

Martin et al., "Recent developments in X-ray imaging with micrometer spatial resolution," Journal of Synchrotron Radiation, vol. 13, 2006, pp. 180-194.

Retot et al., "Improved scintillation time response in ($Lu_{0.5}Gd_{0.5}$)$_2O_3$ : $Eu^{3+}$ compared with $Lu_2O_3$ : $Eu^{3+}$ transparent ceramics," Journal of Physics D: Applied Physics, vol. 44, 2011, 1-9.

Schneider et al., "Phase Equilibria in Systems Involving the Rare-Earth Oxides. Part II. Solid State Reactions in Trivalent Rare-Earth Oxide Systems," Journal of Research of the National Bureau of Standards- A. Physics and Chemistry, vol. 64A, No. 4, 1960, pp. 317-332.

Trojan-Piegza et al., Afterglow Luminescence of $Lu_2O_3$:Eu Ceramics Synthesized at Different Atmospheres, J. Phys. Chem. C, vol. 114, 2010, pp. 4215-4220.

Jacques et al., "Definition and units of scattering coefficient," ECE 532 Biomedical Optics, 1998, pp. 1-2.

Wiktorczyk, T., "Optical properties of electron beam deposited lutetium oxide thin films," Optica Applicata, vol. 30, No. 1, 2001, pp. 83-92.

Hoheisel, M., "Review of medical imaging with emphasis on X-ray detectors," Nuclear Instruments and Methods in Physics Research Section A: Accelerators, Spectrometers, Detectors and Associated Equipment, vol. 563, Issue 1, Jul. 1, 2006, pp. 215-224.

van Eijk, C., "Inorganic scintillators in medical imaging detectors," Nuclear Instruments and Methods in Physics Research Section A: Accelerators, Spectrometers, Detectors and Associated Equipment, vol. 509, Issue 1, Aug. 2003, pp. 17-25.

\* cited by examiner

LUTETIUM OXIDE-BASED TRANSPARENT CERAMIC SCINTILLATORS

RELATED APPLICATION

This application claims priority to U.S. Provisional Patent Application Ser. No. 61/538,054, filed Sep. 22, 2011, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to transparent ceramics, and particularly, to a transparent ceramic formed by intersubstitution of rare earth ions, especially $Lu_2O_3$-based transparent ceramics.

BACKGROUND

It is known that rare earth oxides are materials of great interest in forming transparent ceramics, e.g. for use as optical components, for example in laser amplifiers, scintillators and ultraviolet (UV) lenses. However, very few material compositions are viable and/or available as large sized transparent ceramic components.

One reason for the main challenges of working with these materials and creating large components is the high melting temperature, which makes sintering to full density particularly difficult. Furthermore, many of these oxides undergo a phase change from cubic to monoclinic with increasing temperature and pressure.

$Lu_2O_3$ with Eu is a recently developed material suggested for use in X-ray scintillator screens. However, due to the larger atomic radius of Eu, it is not completely stable in the $Lu_2O_3$ lattice and tends undesirably to be exsolvated to the grain boundaries in the ceramic to form secondary phases, which reduce transparency of the resulting ceramic.

Some conventional approaches have included attempting to form translucent ceramics from oxides of europium, lutetium and gadolinium, but none have been able to achieve the desirable near-perfect transparency disclosed herein. For example, the europium doped lutetium gadolinium oxides disclosed in "Effects of Doping $Lu_2O_3$ on Phase Transformation and Luminescence" *IEEE Trans. Nuc. Sci.* 57:1343-47 (2010) to Qin, et al. disclose compositions having poor transparency characteristics, namely having optical transmittance no greater than 75% for a 0.25 mm thick component, which corresponds to a scatter coefficient of approximately 90%/cm. See, e.g. FIG. 4 of Qin, et al.

Applying both temperature and pressure simultaneously is commonly used to fabricate fully dense ceramics in conventional processes. Fully dense ceramics because residual porosity undesirably scatters photons traveling through the medium, decreasing the transparency thereof. However, extreme temperature and pressure is easily triggers cubic to monoclinic phase transformations. Similar to residual pores, secondary phase structures (especially monoclinic phase structures) scatter photons traveling through the medium, and further decrease the transparency thereof.

Therefore, it is exceedingly difficult to achieve a fully transparent ceramic (e.g. over 75% transmittance, less than 10%/cm scatter) according to conventional methods and materials known in the art. Since scatter increases with the length of the path a photon travels through a given medium, it is even more difficult to produce fully transparent ceramics on a macro-scale (e.g. diameter greater than 25 mm, thickness greater than 0.25 mm).

Accordingly, it would be desirable to provide large-scale fully transparent ceramics that do not have the residual porosity and monoclinic structures found in conventional ceramics formed by traditional fabrication methods. Furthermore, it would be advantageous to describe methods of fabricating such ceramics, where the constituent materials do not undergo to cubic to monoclinic phase changes during sintering and/or pressurization and exhibit substantially no residual porosity. These developments would desirably improve the transparency characteristics of ceramic products for use in military, medical, basic research and commercial applications.

SUMMARY

In one general embodiment, a transparent ceramic of sintered nanoparticles includes gadolinium lutetium oxide doped with europium having a chemical composition $(Lu_{1-x}Gd_x)_{2-y}Eu_yO_3$, where X is any value within a range from about 0.05 to about 0.45 and Y is any value within a range from about 0.01 to about 0.2, and where the transparent ceramic exhibits a transparency characterized by a scatter coefficient of less than about 10%/cm.

In another embodiment, a transparent ceramic scintillator of sintered nanoparticles, includes a body of sintered nanoparticles including gadolinium lutetium oxide doped with a rare earth activator (RE) having a chemical composition $(Lu_{1-x}Gd_x)_{2-y}RE_yO_3$, where RE is selected from the group consisting of: Sm, Eu, Tb, and Dy, where X is any value within a range from about 0.05 to about 0.45 and Y is any value within a range from about 0.01 to about 0.2, and where the transparent ceramic exhibits a transparency characterized by a scatter coefficient of less than about 10%/cm.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations as would be understood by the skilled artisan reading the present descriptions.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Except where otherwise defined, the terms "about" and "approximately" with reference to a value indicate that value up to ±10% of the value.

In one general embodiment, a transparent ceramic of sintered nanoparticles includes gadolinium lutetium oxide doped with europium having a chemical composition ($Lu_{1-x}Gd_x)_{2-y}Eu_yO_3$, where X is any value within a range from about 0.05 to about 0.45 and Y is any value within a range from about 0.01 to about 0.2, and where the transparent ceramic exhibits a transparency characterized by a scatter coefficient of less than about 10%/cm.

In another embodiment, a transparent ceramic scintillator of sintered nanoparticles, includes a body of sintered nanoparticles including gadolinium lutetium oxide doped with a rare earth activator (RE) having a chemical composition $(Lu_{1-x}Gd_x)_{2-y}RE_yO_3$, where RE is selected from the group consisting of: Sm, Eu, Tb, and Dy, where X is any value within a range from about 0.05 to about 0.45 and Y is any value within a range from about 0.01 to about 0.2, and where the transparent ceramic exhibits a transparency characterized by a scatter coefficient of less than about 10%/cm.

In one embodiment, the composition of the transparent ceramics as described herein follows the general formula $Gd_xLu_{1.9-x}Eu_{0.1}O_3$, where X varies in a range from about 0.5 to about 0.45. In general, the transparent ceramics discussed in the present disclosures are preferably fabricated by a sintering and hot-isostatic pressurization process, but may be fabricated using any suitable methodology as would be known to one having ordinary skill in the art upon reading the present disclosures.

In another embodiment, the composition of the transparent ceramics as described herein follows the general formula $(Lu_{1-x}Gd_x)_{2-y}Eu_yO_3$, where X is any value within a range from about 0.05 to about 0.45 and Y is any value within a range from about 0.01 to about 0.2.

In embodiments employing sintering and HIP, the transparent ceramics may be formed by sintering to a temperature below a cubic-to-monoclinic phase transition temperature under a vacuum (e.g. 1750° C., $10^{-4}$ Pa) and HIP conditions with a similar temperature (e.g. about 1750° C.) and high pressure (e.g. a pressure of about 200 MPa). Of course, other fabrication conditions may be employed as required given the material composition and the desired transparency of the resulting ceramic, as would be appreciated by one having ordinary skill in the art upon reading the present descriptions.

Optical micrographs of transparent ceramics produced using the materials and methods disclosed herein revealed the scatter coefficients for two exemplary embodiments to be about 11.5%/cm for a composition of $Lu_{1.9}Eu_{0.1}O_3$, and about 3.8%/cm for a configuration of $Gd_{0.3}Lu_{1.9}Eu_{0.1}O_3$, respectively.

Figure 4:
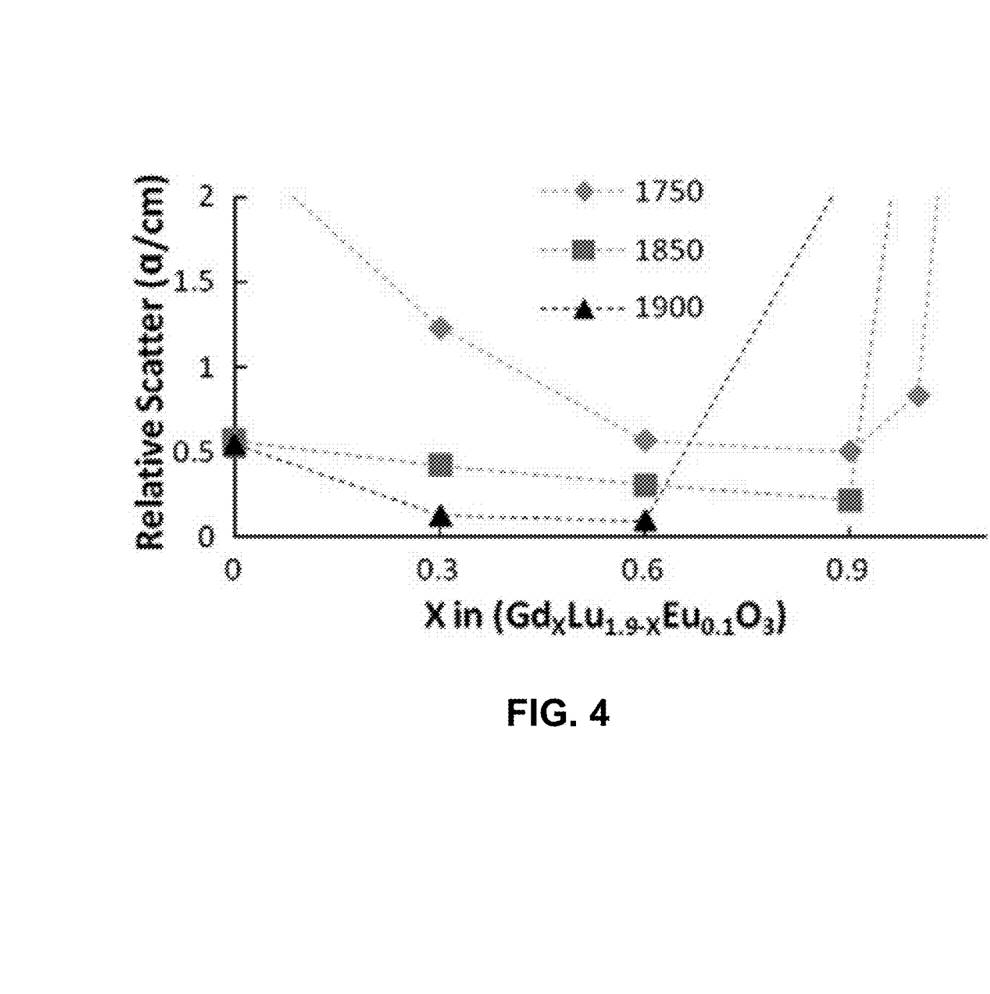
FIG. 4 is a graphical representation of relative scatter (α/cm) according to several exemplary embodiments of transparent ceramics.

According to several illustrative embodiments, the transparent ceramic products according to the present descriptions may follow a general chemical composition according to any of the following disclosures. In one approach, the transparent ceramic $(Lu_{1-x}Gd_x)_{2-y}Eu_yO_3$, where X is any value within a range from about 0.1 to about 0.45 and Y is any value within a range from about 0.01 to about 0.2. In more embodiments, Y may have any value within a range from about 0.04 to about 0.15; and/or X may have any value within a range from about 0.05 to about 0.30. In particularly preferred embodiments, X is about 0.15, and/or Y is about 0.06. FIG. 4 is a graphical representation of relative scatter (α/cm) according to several exemplary embodiments of transparent ceramics In other words, the transparent ceramics may be characterized as comprising $Lu_2O_3$ in combination with about 10-45 mol % $Gd_2O_3$ and about 0.5-10 mol % $Eu_2O_3$, in some approaches. Of course, other compositions may be selected without departing from the scope of the inventive ceramics disclosed herein, so long as the resulting ceramic exhibits the excellent transparency as discussed in these disclosures, as will be appreciated by those having ordinary skill in the art upon reading the present descriptions. Other compositions may be characterized by differing mol % amounts of the compounds described above and/or different elemental compositions than described above, in alternative embodiments.

Figure 1:
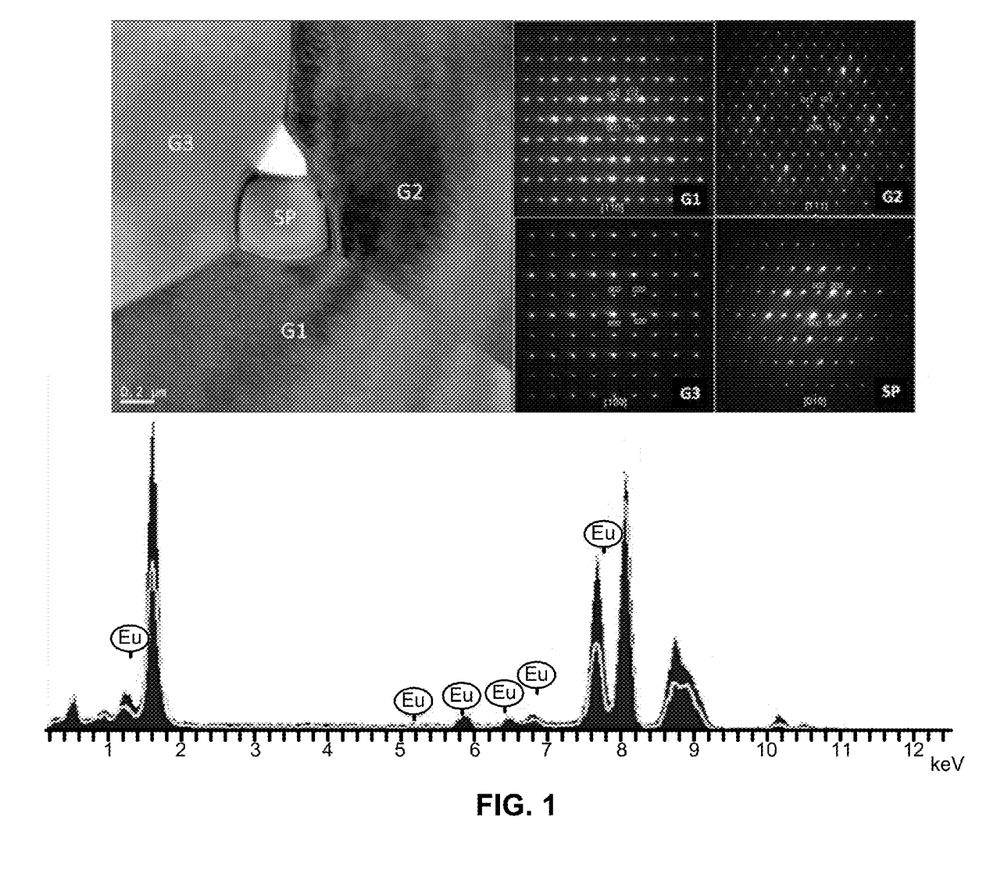
FIG. 1 is a transmission electron micrograph (upper left) of a triple junction between three large grains in a transparent ceramic, along with corresponding X-ray diffraction patterns (upper right) and an energy-dispersive X-ray spectrum (bottom), according to one embodiment.

Referring now to the Figures, FIG. 1 is a transmission electron micrograph of a triple junction between three large grains in a transparent ceramic, according to one embodiment. In particular, the TEM image shows a secondary phase SP and a pore above the secondary phase, both the secondary phase and the pore being situated in a triple junction between three large grains G1, G2, and G3 of ceramic material.

With continuing reference to FIG. 1, the upper right-hand pane depicts selected area diffraction patterns of the corresponding regions as labeled in the TEM image. As will be appreciated by those of skill in the art reading the present descriptions and viewing FIG. 1, the diffraction patterns demonstrate that while the three large grains G1-G3 exhibit a cubic structure, the secondary phase SP undesirably exhibits a monoclinic structure, which reduces the overall transparency of the resulting ceramic.

Moreover, as can be gleaned from the lower portion of FIG. 1, an energy-dispersive X-ray spectrum is shown and reveals the composition of the secondary phase as being rich in europium.

Figure 2:
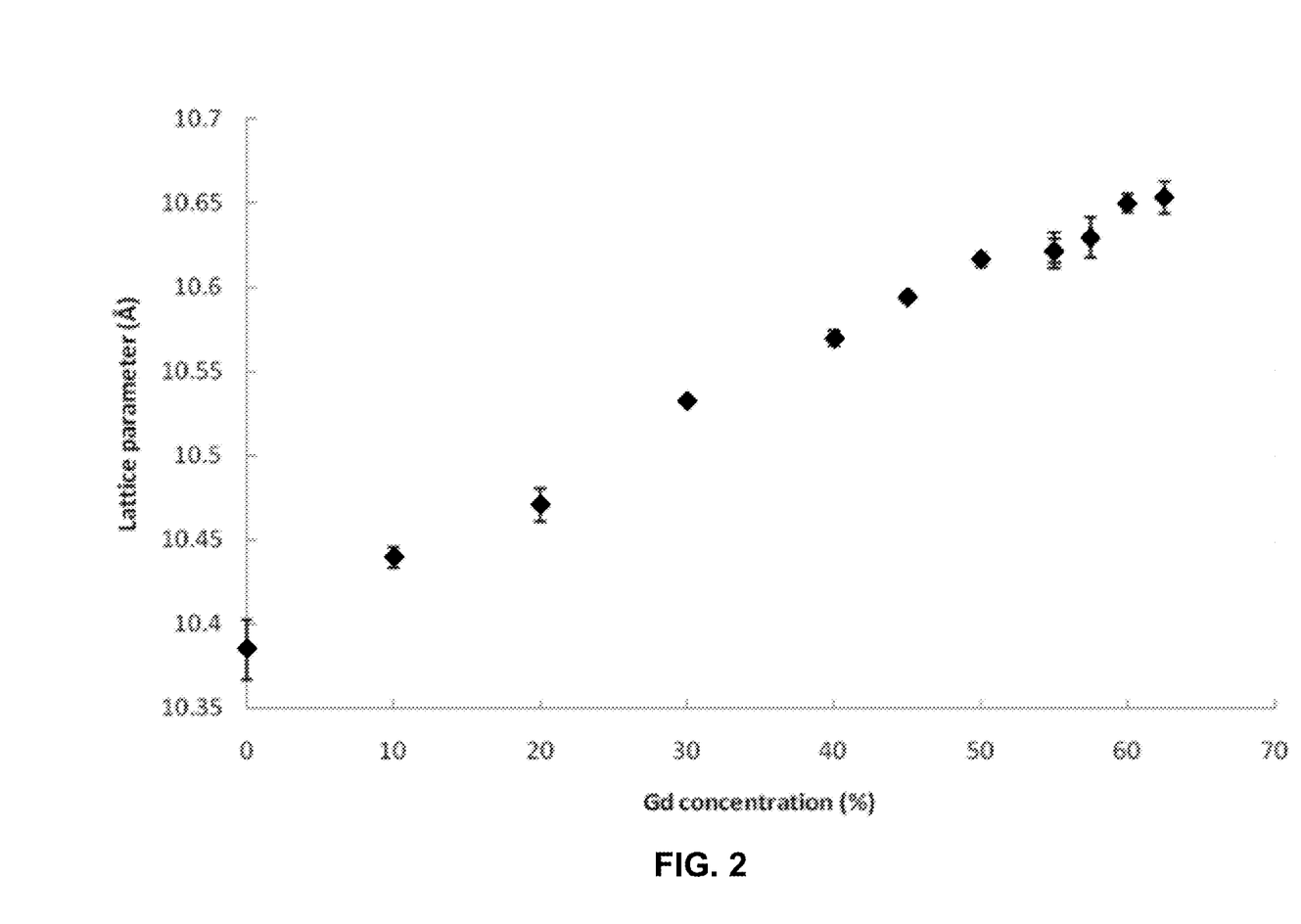
FIG. 2 is a graph depicting a relationship between lattice parameter and concentration of rare earth activator (gadolinium), according to one embodiment.

FIG. 2 is a graph depicting a relationship between lattice parameter and concentration of rare earth activator (gadolinium), according to one embodiment. As can be seen from the graph, lattice parameter increases linearly as a function of activator concentration, a phenomenon the inventors theorize contributes to improved transparency of the resulting ceramic compound, perhaps by allowing the europium to stay in the cubic lattice as a solid solution.

Figure 3:
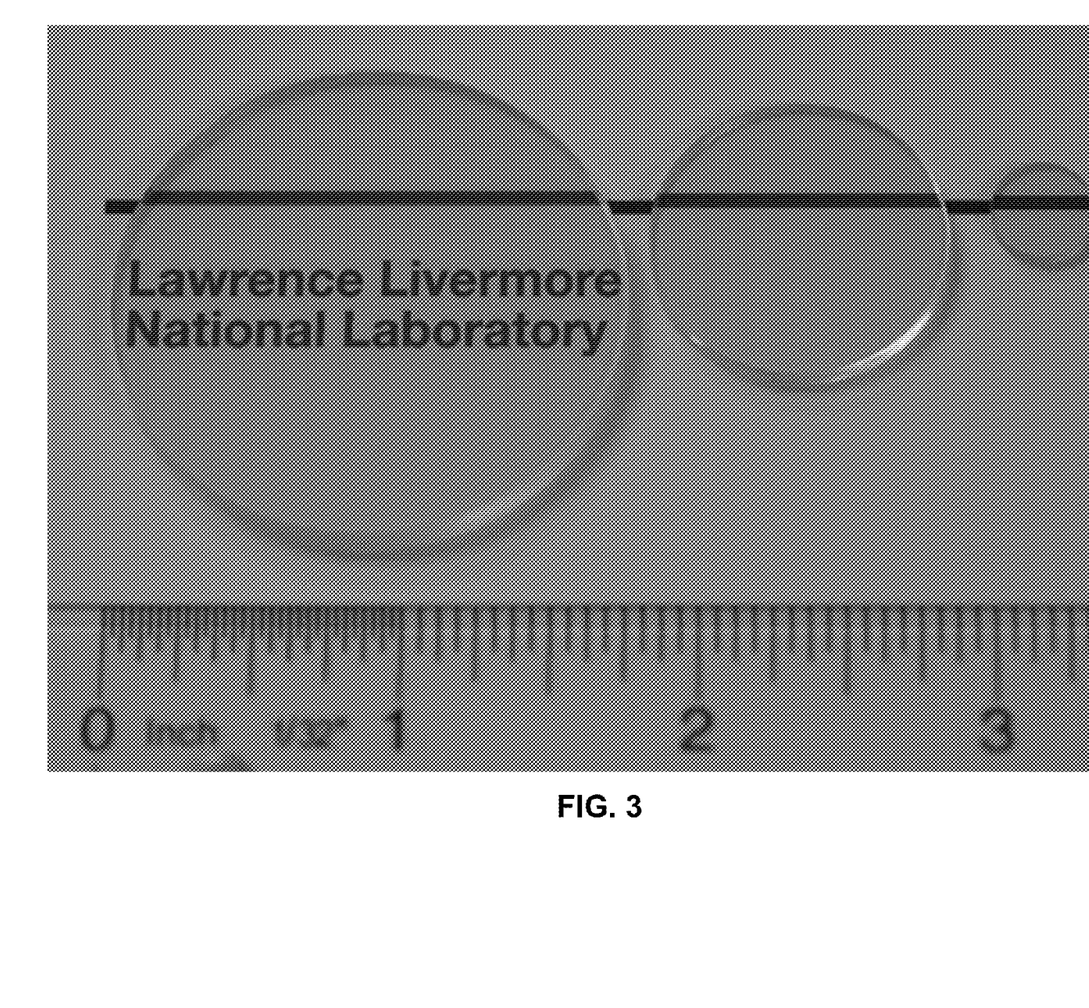
FIG. 3 shows several large-scale transparent ceramics, according to multiple embodiments.

FIG. 3 shows several transparent ceramics, according to multiple embodiments of different size scale. Of particular note regarding the embodiments shown in FIG. 3, and representative of an especially advantageous improvement of the presently disclosed systems and methods is the ability to dramatically increase component size while retaining a high degree of transparency across a wide range of component sizes. Thus, FIG. 3 represents a proof of principle that transparent ceramics may be fabricated on a higher-size scale than conventional processes while maintaining highly transparent characteristics advantageous to a wide variety of applications such as discussed in detail below.

Of course, as will be appreciated by one having ordinary skill in the art upon reading the present descriptions, ceramics having a size greater than that depicted in FIG. 3 may be fabricated and still retain highly transparent character by utilizing a larger mold for sintering and HIP compression, in some embodiments. For example, transparent ceramics having a thickness T in the range of about (20 μm≤T≤10 cm) and a diameter D in the range of about (1 mm≤D≤0.5 m). However, these exemplary ranges are merely illustrative and are not limiting on the scope of ceramic thickness and/or diameter falling within the context of the present disclosure. In one particularly preferred embodiment, the transparent ceramic is characterized by a thickness from about 20 µm to about 1000 µm and a diameter from about 0.2 cm to about 2.5 cm. In another preferred embodiment, the transparent ceramic is characterized by a thickness from about 1 mm to about 10 mm and a diameter from about 5 cm to about 35 cm.

Without wishing to be bound to any particular theory, the inventors propose that addition of one or more rare earth oxides and one or more rare earth activators into the system increases the lattice parameter of the $Lu_2O_3$ crystalline structure, allowing the rare earth activator (e.g. Eu, Tb, Dy, Sm as would be understood by the ordinarily skilled artisan reading the present descriptions) to better fit into the lattice and consequently form a solid solution by intersubstitution. As a primary advantage, increasing the lattice parameter and consequently the rare earth activator fit capability significantly increases the transparency of the ceramic as compared to systems and methods for producing corresponding ceramics without including one or more rare earth oxides and one or more rare earth activators for intersubstitution during the sintering process.

Further improvements in ceramic transparency may be conferred in some embodiments by ensuring that the final ceramic product is substantially devoid of residual porosity.

In one configuration a transparent ceramic according to the present disclosures includes a body comprising sintered nanoparticles, and has physical characteristics of being formed by intersubstitution during vacuum-sintering followed by hot isostatic pressurization (HIP).

In another configuration, rather than performing the sintering under vacuum, nanoparticles may be sintered in a gas environment, and the gas may comprise one or more of helium, oxygen, argon, etc. as would be understood by one having ordinary skill in the art upon reading the present descriptions.

Sintered nanoparticles may be constructed from nanopowder precursors of rare earth oxides by flame spray pyrolysis, according to one approach. Of course, any suitable method for creating a nanoparticle powder may be utilized. In preferred approaches, the nanopowder precursor is characterized by a mean particle diameter in the range of about 20 nm to about 1000 nm. Furthermore, the nanopowder precursor particles may be substantially uniform in shape and size, and may be spherical or substantially spherical in shape. According to more approaches, the nanopowder precursor particles may exhibit low agglomeration tendencies so as to maintain a fine uniform powder To form green bodies according to some approaches, the nanoparticle powder may be dispersed in a dispersant, e.g. polyethylene glycol (PEG) along with a binder. Dispersion may be accomplished by any suitable method, such as high shear mixing, ultrasonification, etc. as would be appreciated by a skilled artisan upon reading the present descriptions. Conditions such as temperature, pH, etc. of the suspension may be controlled according to methods known in the art.

According to one embodiment, the slurry may further be spray-dried to confer an advantageously even distribution of agglomerates for subsequent pressing and/or sintering as will be discussed in detail below. In particular, in one exemplary approach spray-drying may include atomizing the slurry in a nitrogen environment at a temperature of approximately 200° C. Moreover, particles may be coated with one or more organic compounds to facilitate even agglomerate distribution, as would be appreciated by one having ordinary skill in the art upon reading the present descriptions. In still further approaches, the slurry may be passed through a filter or sieve, e.g. a filter or sieve having a pore diameter less than or equal to about 50 µm, in a preferred approach. Filtering the slurry is especially effective in constricting particle agglomerate size to a desired range, as skilled artisans will appreciate to be advantageous upon considering the present disclosure.

In some situations, it may be advantageous to press the slurry into a pre-formed configuration before sintering, e.g. by warm pressing in a carbon die. Pressing the slurry under heat prior to sintering may be particularly advantageous where particles are coated with organics in forming the slurry composition as described above, because heating the slurry during pressing permits organics to flow freely and evaporate out of the slurry solution. In some approaches, warm pressing may be performed by subjecting the slurry to pressures in a range of about 7500 PSI to form a pre-formed part characterized by a density of approximately 40% or more, without requiring any drying of the part and/or without the part experiencing any volumetric size reduction.

Further still, heat may be applied during and/or after the pressing, e.g. by incubating the die containing the slurry in an environment comprising an air atmosphere at temperatures in the range of approximately 1000° C. or more.

In more approaches, pre-sintering processes may include calcination of the slurry and/or pre-formed green body, for example in order to completely remove organic compounds from the green body.

In some embodiments the ultimate transparent ceramic may exhibit physical characteristics of being formed by intersubstitution during vacuum-sintering followed by hot isostatic pressurization. Such characteristics may include excellent optical properties for applications described below, such as a transparency characterized by a scatter coefficient of less than about 25%/cm in one embodiment, less than about 10%/cm in another embodiment, less than about 5%/cm in still another embodiment, and less than about 3.8%/cm in a particularly preferred embodiment.

Of course, as will be appreciated by one having ordinary skill in the art reading the present disclosures, transparent ceramics within the scope of the instant inventive concept may have a transparency characteristic that is configurable according to the desired application for the resulting product, e.g. by manipulating the sintering temperature, HIP pressure, and/or composition of the rare earth oxide and/or rare earth activator(s) disposed in the nanoparticle powder from which the transparent ceramic is to be formed.

FIG. 4 is a graphical representation of relative scatter (α/cm, where 1 α/cm=100%/cm and 0.1 α/cm=10%/cm) according to several exemplary embodiments of transparent ceramics within the scope of the present disclosure. In particular, FIG. 4 shows the scatter coefficients achieved as a function of both the chemical composition of the transparent ceramic at various sintering and/or HIP temperatures (° C.). The transparent ceramics for which data are shown in FIG. 4 follow the general composition $(Gd_xLu_{1.9-x}Eu_{0.1}O_3$, where the value of X is as shown on the X axis of the graph. The scatter coefficient achieved using the depicted fabrication temperature is described along the corresponding curve.

In some embodiments, rather than being formed directly from the nanoparticle powder, transparent ceramics may be formed from a green body having a density greater than about 40%. Advantageously, such pre-sintering green body formation may improve the transparency of the ultimate ceramic product by facilitating the sintering and HIP processes as described in more detail below.

In more embodiments, the transparent ceramic as described herein may be characterized by density greater than about 99.9, and ideally about 100%, which desirably improves transparency by reducing the ceramic product's scatter coefficient, as would be understood by one having ordinary skill in the art upon reading the present descriptions.

The transparent ceramic of some embodiments consistent with the present disclosure may be characterized by a substantially cubic structure that may be substantially devoid of monoclinic structures. The inventors discovered that the likelihood of cubic-to-monoclinic phase transition, which undesirably results in increased scattering of light particles, may be substantially reduced by employing the intersubstitution processes and/or sintering and HIP conditions as described herein.

The transparent ceramic according to some configurations may be characterized by having a substantially cubic structure that is substantially devoid of residual porosity. In other words, the transparent ceramic may be characterized as "phase-pure," having no monoclinic structures whatsoever in preferred embodiments. In particularly preferred embodiments, the grain structures comprising the transparent ceramic are cubic, and the crystal grain lattice is cubic in nature, i.e. 100% cubic.

In some embodiments the transparent ceramic may be characterized by having no residual porosity, i.e. the transparent ceramic is fully dense.

One particular advantage of employing the systems and methods described herein is the capability to produce large transparent ceramic components for a wide variety of applications. In some embodiments the ceramic may be characterized by a diameter of about 12 inches or more.

As will be understood by skilled artisans reading the present description, rare earth oxides suitable for use in producing transparent ceramics according to the present disclosure include, but are not limited to, oxides of Lu, Sm, Eu, Gd, Tb, Dy, in several embodiments. Of course, other rare earth oxides may be employed for use in producing transparent ceramics without departing from the scope of the present disclosure, as would be understood by one having ordinary skill in the art upon reading the descriptions provided herein. Furthermore, in some embodiments the rare earth oxides may be classified as rare earth sesquioxides.

According to the principles disclosed herein, the use of intersubstitutional ions for phase stabilization during sintering may be applied to other rare earth oxide systems, as would be understood by one having ordinary skill in the art upon reading the present descriptions.

Figure 5:
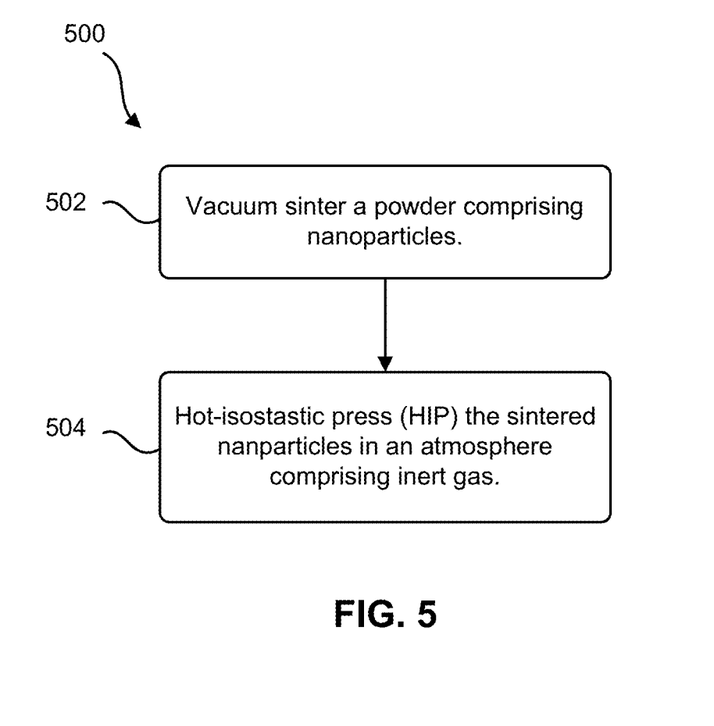
FIG. 5 is a flow diagram of a method according to one embodiment.

Now referring to FIG. 5, a method 500 for tuning a tunable resistor/transistor is shown according to one embodiment. The method 500 may be carried out in any desired environment, including those shown and described in FIGS. 1-4, according to various embodiments. Also, more or less operations than those specifically described in FIG. 5 may be included in method 500 in several approaches.

In operation 502, a powder of nanoparticles including one or more rare earth oxides and one or more rare earth activators is sintered under a vacuum, according to one approach. In this manner, it is possible to form a transparent ceramic to a density of about 95% or more after the vacuum sintering, according to preferred approaches.

In operation 504 the sintered nanoparticles are pressurized by a hot-isostatic pressurization (HIP) process, according to another approach. Preferably, the HIP process is conducted in an atmosphere comprising an inert gas, such as argon, xenon, neon, etc. as would be understood by one having ordinary skill in the art upon reading the present descriptions.

Of course, as will be understood by one having ordinary skill in the art the presently disclosed fabrication methods may not be limited to sintering or compression as referenced above and shown in FIG. 5. For example, one alternative process may employ a controlled gas environment furnace (e.g. oxygen as the gas) and/or a hot press while still being capable of achieving the desired density and transparency characteristics discussed herein.

In some approaches, the vacuum sintering may be performed under an atmospheric pressure of about $1 \times 10^{-2}$ Pa or less as would be understood by one having ordinary skill in the art upon reading the present descriptions.

In more approaches, the vacuum sintering may include heating the powder to a temperature less than a cubic-to-monoclinic phase transition temperature of a rare earth metal oxide in the powder, and may in particular include heating the powder to a temperature between about 1550° C. and about 1750° C. Of course, other sintering temperatures may be employed according to the transition temperature of the rare earth metal oxide(s) present in the nanoparticle powder.

By following the exemplary sintering and pressing methods as described herein, it is possible to achieve a substantially dense transparent ceramic, e.g. in several embodiments the transparent ceramic produced by the sintering and pressing methodologies described herein may be characterized by a density of more than about 99.9%, and ideally about 100%, as would be understood by one having ordinary skill in the art upon reading the present descriptions. Higher densities are particularly advantageous in conferring a high degree of transparency on the resulting ceramic, and desirably result in substantially no residual porosity of the final transparent ceramic product.

Experimental Observations

Several experiments performed in the course of developing and testing transparent ceramics as described herein will now be detailed. The inventors wish to emphasize that the optical properties of ceramics produced according to the compositions and methodologies disclosed herein were not initially expected to produce the near-perfect transparency (e.g. scatter less than about 10%/cm) that was surprisingly observed. Rather, transparent ceramics created according to the presently disclosed methods and having the presently disclosed compositions were being investigated for a different purpose, i.e., during attempts to increase the light yield of conventional transparent ceramics, especially lutetium-europium based ceramics. Contrary to the inventors' expectations, adding gadolinium to the lutetium-europium based nanoparticle powder and sintering to form a ceramic had no effect on light yield, but surprisingly and unexpectedly increased transparency of the resulting ceramic.

This result could not have been predicted at the time of the discovery because the mechanism by which the aforementioned surprising results were achieved was not known in the art. Without wishing to be bound to any particular theory, the inventors believe the resulting near-perfect transparency surprisingly achieved by including Gd in the sintered nanoparticle composition is attributable to resulting ceramic structures being phase-pure, i.e. fully composed of cubic grain structures and lacking residual porosity. Because of this discovery, it is believed that other similar transparent ceramics having rare each activators such as Dy, Eu, Tb, and Sm may be fabricated using oxides of rare earth elements such as Lu and Gd.

Furthermore, the inventors postulate that such structures are capable of being created and particularly on the large scales disclosed herein because rare earth activator ions are capable of migrating into and/or do not migrate out of the rare earth oxide crystalline lattice during the sintering and pressing operations, which was neither the design nor the expectation for the result of initial experiments. However, upon discovering the excellent optical characteristics of structures formed as disclosed herein, the following experimental results demonstrated the applicability of the presently described materials and methods for generating transparent ceramics suitable for use in a broad range of practical applications to great advantage.

In one experimental embodiment, nanoparticles with the composition $Gd_xLu_{1.9-x}Eu_{0.1}O_3$ (X=0.3, 0.6, 0.9, 1.0, and 1.1) were synthesized via the flame spray pyrolysis (FSP) method by Nanocerox™ (Ann Arbor, Mich.). A Philips CM300-FEG high resolution transmission electron microscopy (HRTEM) operated at 300 kV was used to characterize the nanoparticles for structure and crystallinity.

Nanoparticles were suspended in an aqueous solution containing polyethylene glycol (PEG) and ammonium polymethacrylate (Darvan C-N) using an ultrasonic probe (Cole Parmer, Vernon Hills, Ill.) and a high shear mixer (Thinky, Japan). This suspension was spray-dried (Buchi, New Castle, Del.) at 210° C. into flowing nitrogen to protect the organics. The dried powder was then sieved (<50 μm) resulting in uniform agglomerates of nanoparticles with an even distribution of organic additives. Formulated nanoparticles were then uniaxially pressed at 50 MPa to form green compacts approximately 40% dense, followed by a heat treatment at 900° C. in air to burn out the organics. Calcined compacts were then loaded into a tungsten element vacuum furnace (Thermal Technologies, Santa Rosa, Calif.) and sintered under a vacuum of $2 \times 10^{-6}$ Torr at 1625° C. for 2 hours to reach closed porosity and densities of approximately 97%. The sintered samples were then hot isostatically pressed (HIP'ed) under 200 MPa of inert argon gas pressure at temperatures ranging between 1750 and 1900° C. for 4 hours in a tungsten element HIP (American Isostatic Presses, Columbus, Ohio). Since the samples exhibited closed porosity after vacuum sintering, no canning was necessary during the HIP step.

Ceramic surfaces were ground flat and parallel, given an inspection polish, and wipe-cleaned with acetone and methanol. Samples were analyzed for defects with visible microscopy (Nikon). A focused ion beam (FIB) was used to extract a slice from within the $Lu_2O_3$:Eu sample and analyzed under HRTEM in order to determine the chemical composition and crystalline structure of the scattering defects. X-ray diffraction (XRD) was used to determine the crystallinity and lattice parameter of HIP'ed samples. The cubic lattice parameter for each composition was calculated from the four most intense cubic peaks using Bragg's law and averaged. Scatter loss measurements using a 633 nm He—Ne laser and a 400 inch integrating sphere were performed on HIP'ed ceramic samples. Scatter coefficients, including both bulk and surface scatter, were determined using Beer's law and were normalized by the sample thickness.

Beta radioluminescence employed a 90Sr/90Y source (~1 MeV average beta energy). Radioluminescence spectra were collected with a Princeton Instruments/Acton Spec 10 spectrograph coupled to a thermoelectrically cooled CCD camera. Light yields are obtained by integrating the spectra and comparing with several known scintillators (IQI-301 glass and crystals of BGO and LuAG:Ce) in the same geometry.

Flame spray pyrolysis (FSP) powder synthesis provides a high quality starting powder for forming transparent ceramics. This method produces uniform particle size and composition in equiaxed particles with very little agglomeration. The average particle size of $Lu_{1.9}Eu_{0.1}O_3$ is 20 nm with a specific surface area (SSA) of 22 $m^2/g$, and the selected area electron diffraction pattern indicates a cubic crystal structure. With the addition of gadolinium into the precursor, the "as-synthesized" particle size increases in average size to about 30 nm with an SSA of 18 $m^2/g$, and displays monoclinic crystal structure. This phase transformation is expected due to the larger atomic radius of gadolinium and quenching from high temperature during FSP synthesis. However, this monoclinic phase transforms back to the cubic phase during subsequent processing which is evident by XRD and the formation of bulk transparent ceramics described below.

For clarity, it is specified that no post-annealing (oxygen bleaching) step was required. Transparent ceramic samples were obtained on the Lu-rich end of the composition range due to the tendency of these compositions to form a fully dense homogeneous cubic bixbyite structure. Optical transparency on the Gd-rich end of the compositional range began to degrade as these compositions are more likely to form a monoclinic phase at high temperatures due to the larger average ionic radius. As the HIP temperature increases, less gadolinium is required to trigger this phase transformation from cubic to monoclinic. Initial monoclinic phase precipitation causes light scattering and reduced transparency, but with sufficient gadolinium and temperature the entire sample becomes monoclinic and ultimately results in complete opacity.

In previous experiments we found that optimization of sinter and HIP processing led to nearly transparent $Lu_2O_3$:Eu. However, in the present study closer examination using optical microscopy reveals that a small amount of secondary phase remaining in the $Lu_2O_3$:Eu produced according to the prior techniques, undesirably resulting in some residual scattering defects. Upon careful inspection of the samples, a slight cloudy appearance was observed in samples containing no gadolinium, and those that were HIP'ed at lower temperatures (1750° C.).

In most of the samples HIP'ed at 1750° C., pores are visible between grains. This indicates that at 1750° C., diffusion was not sufficient to HIP these samples to full density. Residual porosity remains and is the source of scatter causing these samples to look cloudy. As the HIP temperature increases to 1850° C., the pores are fully closed but a small amount of secondary phase remains at the grain boundaries as scattering defects. The amount of this secondary phase appears to decrease with increasing gadolinium content and correlates with the relative transparency of the samples. The samples that appear most transparent have sufficient gadolinium to minimize this secondary phase at the grain boundaries, but not enough to cause the phase transformation to the monoclinic phase, i.e. $Gd_{0.9}Lu_{1.0}Eu_{0.1}O_3$ HIP'ed at 1850° C. and $Gd_{0.6}Lu_{1.3}Eu_{0.1}O_3$ HIP'ed at 1900° C.

Samples HIP'ed at 1750° C. show the highest amount of scatter, with the $Gd_{0.9}$ (i.e., $Gd_{0.9}Lu_{1.0}Eu_{0.1}O_3$) composition being the most transparent. Due to the fact that pores are the principal source of scatter in samples sintered at 1750° C., this indicates that the $Gd_{0.9}$ composition HIP'ed to higher density than samples with less gadolinium. For this composition, this HIP condition is close to the phase transformation from cubic to monoclinic improving the ionic mobility, which is the likely cause for improved sintering in some embodiments.

Samples HIP'ed at 1850° C. display less scatter due to the absence of residual porosity and again, the $Gd_{0.9}$ composition has the best transparency. Samples HIP'ed at 1900° C. show even less scatter due to enhanced pore removal, however at this temperature, the $Gd_{0.9}$ composition forms significant secondary phase and therefore scatter is minimized at the $Gd_{0.6}$ (i.e., $Gd_{0.6}Lu_{1.3}Eu_{0.1}O_3$) and $Gd_{0.3}$ (i.e., $Gd_{0.3}Lu_{1.6}Eu_{0.1}O_3$) compositions.

A common trend is that scatter increases as the Gd content is reduced to zero for all HIP temperatures. Use of a focused ion beam to locate, cross-section, and create a TEM slice of one of these scattering defects allowed a closer examination. FIG. 1 shows a micrograph of a scattering defect located at the triple point between 3 grains. Along with a small pore, this micrograph reveals a secondary phase approximately 500 nm in size. Selected area electron diffraction patterns confirm that the 3 surrounding grains are cubic with a lattice parameter of 10.55 Å, closely matching that of $Lu_2O_3$:Eu, however the secondary phase exhibits a monoclinic structure. Furthermore, X-ray EDS analysis (not shown) indicates that the secondary phase shown in FIG. 1 has 3 times higher europium concentration than the surrounding $Lu_2O_3$:Eu grains. Because this secondary phase is present in significantly larger proportion, compared to that present in our starting powder, we know that it must have formed during the processing stages.

This indicates that during the grain growth of sintering and HIP'ing, some of the europium is being exsolved to the $Lu_2O_3$ grain boundaries. This process is likely due to the mismatch in ionic radii between $Lu^{3+}$ ($8.6 \times 10^{-11}$ m) and $Eu^{3+}$ ($9.5 \times 10^{-11}$ m), where the larger europium ions are unable to easily fit into the cubic $Lu_2O_3$ lattice. As the grains continue to grow some of the europium preferentially segregates to the grain boundaries where defects in the lattice structure are more accommodating for the larger ion. Europium can then travel along the grain boundaries to the triple points, where eventually the local concentration increases to the point of precipitation into a stable Eu-rich monoclinic phase.

Uses and Applications

Illustrative applications of various embodiments include use as transparent armor systems e.g., in police and/or military applications, scintillators, UV lenses, scintillator screens (especially X-ray scintillator screens), synchrotron imaging devices, radiation detectors, computed tomography applications, radiography screens, and other specialized optical component applications as would be understood by the skilled artisan upon reading the present descriptions.

One particularly useful application that will be appreciated by skilled artisans reading the present descriptions concerns nonintrusive inspection systems. In one approach, such an application may include applying X-ray energy characterized by an energy potential in a range from about 1 keV to about 15 MeV to the transparent ceramic; and generating a radiographic image as a result of application of X-ray energy to the transparent ceramic. In some approaches, the image may be characterized by a resolution in the micrometer range, e.g. a resolution in the range from about 100 µm/pixel to about 100 µm/pixel, in one approach).

Another particularly useful application that will be appreciated by skilled artisans reading the present descriptions concerns noninvasive evaluation of medical conditions by radiographic imaging, such as in X-ray applications, computed tomography applications, etc. as would be appreciated by the skilled artisan reading the present disclosures. In one approach, such an application may include applying X-ray energy in a range from about 1 keV to about 15 MeV to the transparent ceramic; and generating a radiographic image as a result of application of X-ray energy to the transparent ceramic. In some approaches, the image may be characterized by a resolution in the micrometer range, e.g. a resolution in the range from about 1 µm/pixel to about 100 µm/pixel, in one approach).

In other approaches, the transparent ceramic as disclosed herein may be used in applications and/or apparatuses substantially as disclosed in "Recent developments in X-ray imaging with micrometer spatial resolution," J. Synchrotron Rad. (2006) 13, 180-194, to Martin, et al.

In still other approaches, the transparent ceramic as disclosed herein may be used in applications and/or apparatuses substantially as disclosed in "Performance of Europium-Doped Strontium Iodide, Transparent Ceramics and Bismuth-loaded Polymer Scintillators" *Proc. of SPIE* (2011) Vol. 8142, to Cherepy, et al.

In various applications described herein, using the transparent ceramic may include using a single transparent ceramic component in one or more imaging apparatuses, may include multiple transparent ceramic components in one or more imaging apparatuses, and/or may include using one or more transparent ceramic components and/or imaging apparatuses in an imaging array, e.g. to create a mosaic image, as would be understood by one having ordinary skill in the art upon reading the present descriptions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A transparent ceramic of sintered nanoparticles, the transparent ceramic comprising: gadolinium lutetium oxide doped with europium having a chemical composition ($Lu_{1-x}Gd_x$)$_{2-Y}$Eu$_Y$O$_3$, wherein X is any value within a range from about 0.05 to about 0.45, wherein Y is any value within a range from about 0.01 to about 0.2, wherein the transparent ceramic exhibits a transparency characterized by a scatter coefficient of less than about 10%/cm, and wherein the transparent ceramic excludes monoclinic structures.

2. The transparent ceramic as recited in claim 1, wherein the transparent ceramic is phase-pure.

3. The transparent ceramic as recited in claim 1, wherein the transparent ceramic consists of a cubic crystal grain lattice.

4. The transparent ceramic as recited in claim 1, wherein the transparent ceramic is characterized by a density of at least about 95%.

5. The transparent ceramic as recited in claim 1, wherein the transparent ceramic is characterized by having substantially no residual porosity, wherein the transparent ceramic consists essentially of grain structures being characterized by a cubic phase.

6. The transparent ceramic as recited in claim 1, wherein the transparent ceramic is characterized by a thickness from about 20 µm to about 1000 µm and a diameter from about 0.2 cm to about 5 cm.

7. The transparent ceramic as recited in claim 1, wherein the transparent ceramic is characterized by a thickness from about 1 mm to about 10 mm and a diameter from about 1 cm to about 35 cm.

8. The transparent ceramic as recited in claim 1, wherein the transparent ceramic exhibits a transparency characterized by a scatter coefficient of less than about 5%/cm.

9. A method of forming the transparent ceramic as recited in claim 1, the method comprising:

sintering powdered nanoparticles under a vacuum and at a temperature below a cubic-to-monoclinic phase temperature of the powdered nanoparticles until the sintered nanoparticles achieve a density of at least about 95%; and pressurizing the sintered nanoparticles to a pressure of about 200 MPa in an atmosphere comprising an inert gas and using a hot-isostatic-pressing (HIP) process, wherein the HIP process comprises heating the sintered nanoparticles to a temperature in a range from about 1750 C to about 1900 C, and wherein the powdered nanoparticles comprise:
  europium;
  lutetium; and
  gadolinium.

10. The transparent ceramic as recited in claim 1, wherein the transparency is further characterized by a transmittance greater than about 75%.

11. A transparent ceramic scintillator of sintered nanoparticles, comprising:
  a body comprising sintered nanoparticles comprising: gadolinium lutetium oxide doped with a rare earth activator (RE) having a chemical composition $(Lu_{1-x}Gd_x)_{2-y}RE_yO_3$,
  wherein RE is selected from the group consisting of: Sm, Eu, Tb, and Dy,
  wherein X is any value within a range from about 0.05 to about 0.45, and
  wherein Y is any value within a range from about 0.01 to about 0.2,
  wherein the transparent ceramic exhibits a transparency characterized by a scatter coefficient of less than about 10%/cm, and
  wherein the transparent ceramic excludes monoclinic structures.

12. The transparent ceramic as recited in claim 11,
  wherein the transparent ceramic is characterized by having substantially no residual porosity,
  wherein the transparent ceramic consists essentially of a cubic phase.

13. The transparent ceramic as recited in claim 11, wherein the transparent ceramic is characterized by a thickness from about 20 µm to about 1000 µm and a diameter from about 0.2 cm to about 5 cm.

14. The transparent ceramic as recited in claim 11, wherein the transparent ceramic is characterized by a thickness from about 1 mm to about 10 mm and a diameter from about 1 cm to about 35 cm.

15. The transparent ceramic as recited in claim 11, wherein the transparent ceramic exhibits a transparency characterized by a scatter coefficient of less than about 5%/cm.

16. The transparent ceramic as recited in claim 11, wherein the RE is selected from the group consisting of: Sm and Dy.

17. A method of forming the transparent ceramic as recited in claim 11, comprising:
  sintering powdered nanoparticles under a vacuum at a temperature below a cubic-to-monoclinic phase temperature of the powdered nanoparticles until the sintered nanoparticles achieve a density of at least about 95%; and pressurizing the sintered nanoparticles to a pressure of about 200 MPa in an atmosphere comprising an inert gas and using a hot-isostatic-pressing (HIP) process, wherein the HIP process comprises heating the sintered nanoparticles to a temperature in a range from about 1750 C to about 1900 C, and wherein the powdered nanoparticles comprise:
    RE;
    Lu; and
    Gd.

18. The transparent ceramic as recited in claim 11, wherein the transparent ceramic is substantially devoid of residual porosity.

19. The transparent ceramic as recited in claim 11, wherein the RE comprises at least two of the: Sm, Eu, Tb, and Dy.

20. A method, comprising:
  using the transparent ceramic as recited in claim 11 to generate a radiographic image, wherein the transparent ceramic is an optical component of an imaging device selected from:
  a synchrotron imaging apparatus;
  an x-ray computed tomography apparatus; and
  an x-ray imaging device.

* * * * *